United States Patent
Pirotta

[15] 3,672,124
[45] June 27, 1962

[54] HARNESS FOR ATTACHING A HORSE TO A VEHICLE

[72] Inventor: Angelo Pirotta, Settimo Milanese, Italy
[73] Assignee: Racing Tack di Angelo Pirotta & C.S.a.a., Milan, Italy
[22] Filed: Nov. 5, 1970
[21] Appl. No.: 87,136

[30] Foreign Application Priority Data
Nov. 29, 1969   Italy.................................54216 A/69

[52] U.S. Cl....................................54/38, 24/190, 24/196
[51] Int. Cl. ........................................................A68b 05/00
[58] Field of Search ...............54/38; 24/171, 181, 190, 194, 24/196

[56] References Cited
UNITED STATES PATENTS

| | | | |
|---|---|---|---|
| 631,136 | 8/1899 | Tener | 54/38 |
| 3,121,271 | 2/1964 | Matthews et al. | 24/196 |

*Primary Examiner*—Hugh R. Chamblee
*Attorney*—Sughrue, Rothwell, Mion, Zinn & Macpeak

[57] ABSTRACT

A lightweight harness for a sulky comprises a central element worn on the horse's back, and a plurality or straps connected to the element by buckles. The strap is laminated from leather and plastics material. The buckle comprises a slotted body with wings defining a wedge-shaped space along the slot, and a guide bracket having two parallel limbs and a crosspiece. A slide member is mounted on the guide limbs and has a wedge-shaped part that enters the wedge-shaped cavity and locks in place a strap that is threaded through the slot, over the slide member, and returns through the slot.

2 Claims, 6 Drawing Figures

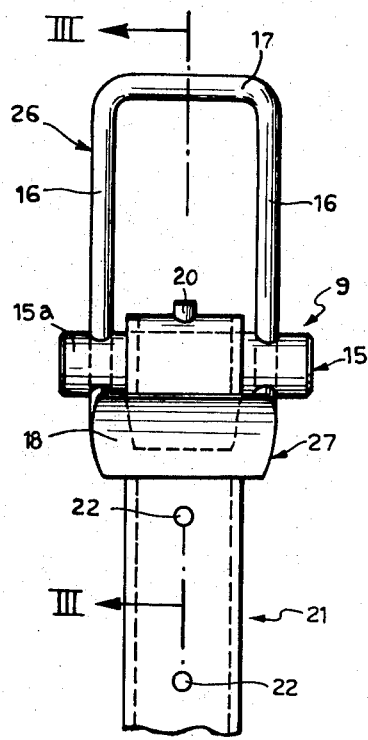
Fig. 2
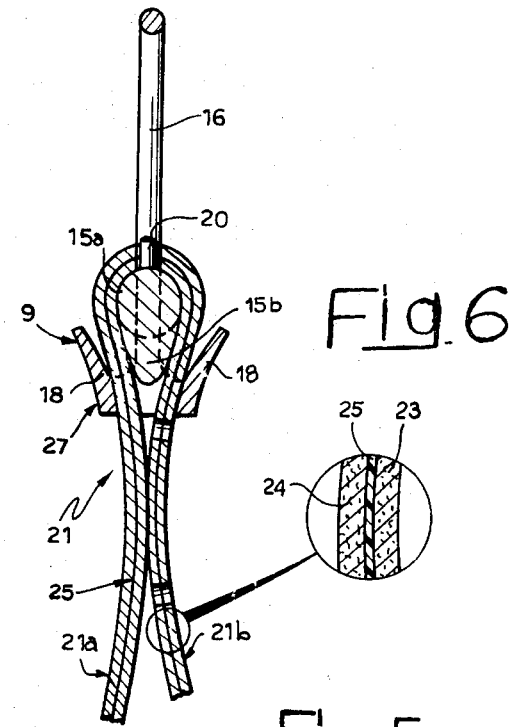
Fig. 3
Fig. 6
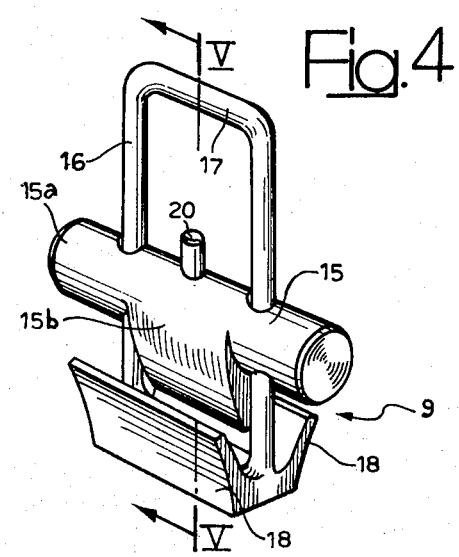
Fig. 4
Fig. 5
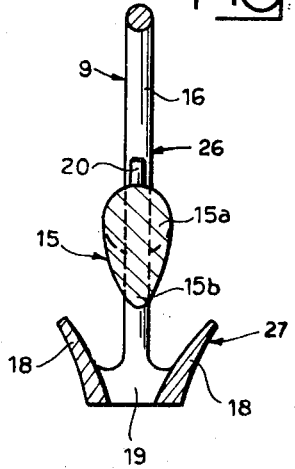

HARNESS FOR ATTACHING A HORSE TO A VEHICLE

This invention relates to harness adapted to be worn by a horse for pulling a lightweight sulky or similar light wheeled vehicle.

As is well known, the harness for a sulky comprises a central element which is secured to the horse's back and is connected by means of adjustable straps to further straps applied to the horse's head, to a crupper, and to two lateral shaft straps and two further straps protecting the forward ends of the shafts.

In order to adjust the length of the straps to suit the harness to different horses, the various straps are connected to the central element by buckles.

In order to reduce the weight of the harness as much as possible it has been proposed to make the straps of composite laminated form, comprising at least two thin leather layers having interposed therebetween a layer of plastics material. This composite strap is of a tensile strength considerably higher than natural leather, so that it is possible to reduce the cross section of the strap and thereby make the harness of lighter weight.

However, with laminated straps, conventional buckles having a central pin engaging in a hole in the strap cannot be employed, as localized forces around the hole would then not be withstood by the strap.

The invention solves the above problem by providing a harness of the above described type which has buckles suitable for the use of laminated straps, whereby the whole width of the straps can be utilized to secure the strap to the buckle. The straps can thus be substantially reduced in thickness and weight compared to known harness.

The invention provides a harness adapted to be worn by a horse for pulling a sulky, the harness comprising a central element for mounting on the horse's back and a plurality of straps connected to the central element by buckles, the straps comprising superposed layers of leather and plastics material, the improvement that the buckles each comprise a body member having an elongated slot therein through which a double thickness of the strap may pass, two wings extending along the length of the slot and located one on each side of the slot, the wings diverging from each other in a direction away from the slot so as to define walls of a wedge-shaped cavity the body member further carrying rigidly with it a guide bracket having two parallel limbs connected at one end to each other by a cross-piece and connected at their other ends to the body member with the limbs straddling the length of the slot; and including a slide member mounted on the limbs of the guide bracket and slidable along it, the slide member comprising a first elongated portion that has two holes therein each accommodating a limb of the guide bracket, and a second part of wedge shape that is solid with the first part and is located between the limbs of the guide bracket, such second part being adapted to extend into the wedge-shaped cavity between the wings of the body member and to lock against the walls of that cavity a strap that is threaded through the slot to pass over the slide member and return through the slot.

Further features and advantages of the invention will be understood from the following description referring to the accompanying drawings, wherein:

FIG. 2 is an elevational side view of one of the buckles of the harness of FIG. 1;

FIG. 3 is a longitudinal sectional view of the buckle of FIG. 2, taken on line III—III of FIG. 2;

FIG. 4 is a perspective view of the buckle of FIGS. 2 to 3;

FIG. 5 is a longitudinal sectional view on the line V—V of FIG. 4; and

FIG. 6 is an enlarged view of the section of the strap encircled in FIG. 5.

Figure 1:
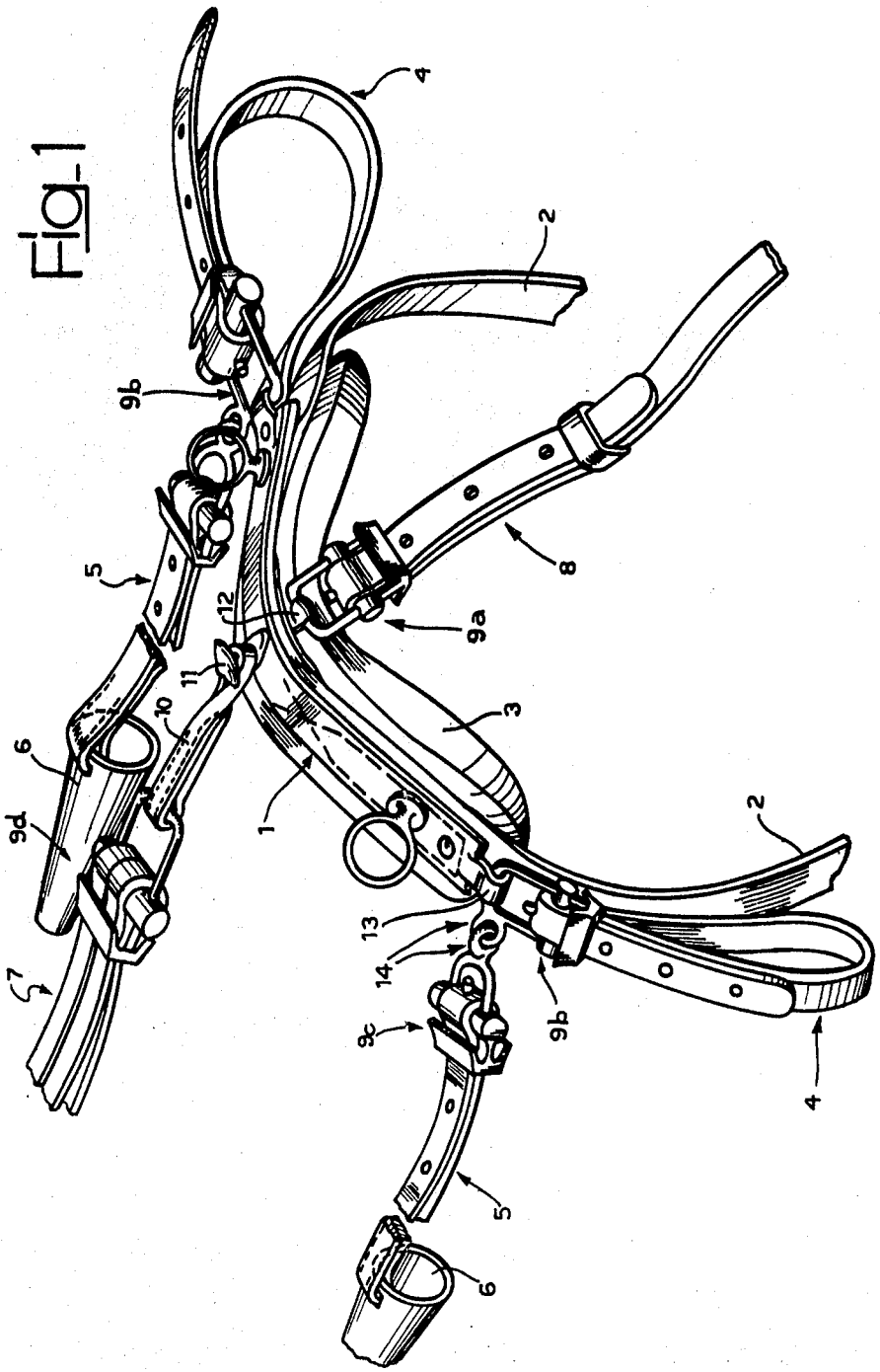
FIG. 1 is a perspective view of part of a harness according to the invention.

Referring to FIG. 1, reference numeral 1 denotes a central element of the harness according to the invention, which is provided with straps 2 for attaching it to the back of a horse, and has a padding 3.

A loop 4 is connected to each end of the element 1 to hold the shafts of the sulky. The loops 4 are connected by further straps 5 to ferrules 6 which are fitted on the forward ends of the shafts.

The main element 1 is also connected by pairs of parallel straps 7 to a forward element (not shown) adapted to be fitted to the horse's head, and by a further strap 8 to a crupper (also not shown).

The above-mentioned straps are made of laminated leather comprising at least two thin leather layers 23, 24 (FIG. 6) having interposed therebetween a layer of plastics material 25 such as synthetic fiber.

The straps are each connected to the main element 1 by buckles generally denoted by 9a, 9b, 9c, 9d by means of which the straps can be adjusted in length, the full width of the straps acting to resist tension forces.

The forward element connected by the straps 7 is fastened to the central element 1 by a band 10 engaged by a stud 11 extending from the top of the central element.

The crupper strap 8 is connected by a buckle 9a to an eye 12 integral with the central element 1, the loops 4 arranged on either side being connected by buckles 9b to eyes 13 on the central element 1.

The straps 5 for the shaft ferrules 6 are connected to the loops 4 by pairs of interengaging rings 14 fixed on buckles 9b, 9c.

FIGS. 2 to 5 are detailed views of a buckle 9 generally suitable for use in the harness of FIG. 1 for connecting the laminated leather straps to the central element 1.

The buckle 9 comprises a body member 27 having an elongated slot 19 that is slightly longer than the width of a strap 21 and slightly wider than twice the thickness of the strap 21. The body member 27 also has two wings 18 that extend along the length of the slot 19 and are located one to each side of it. The wings diverge from each other in a direction away from the slot 19 so as to define walls of a wedge-shaped cavity.

Rigidly fixed on the body member 27 is a guide bracket 26 comprising two parallel limbs 16 and a cross-piece 17 at one end of the limbs. The other ends of the limbs 16 are connected to the body member 27 with the limbs straddling the length of the slot 19.

The buckle also includes a slide member 15 having a first part 15a of cylindrical shape, somewhat longer than the width of the guide bracket 26. The part 15a has two holes each accommodating a limb 16 so that the slide member is slidable along the guide bracket 26 but nevertheless forms an irremovable part of the buckle. Integral with the first part 15a is a second wedge-shaped part 15b that is located between the limbs 16. The wedge surfaces of the second part 15b are inclined to each other at approximately the same angle as the angle between the walls of the wings 18 that define the wedge-shaped cavity in the body member 27.

The first part 15a of the slide member carries a pin 20 projecting towards the cross-piece 17, and the strap 21 has holes 22 at intervals to receive the pin 20.

The strap 21 enters the slot 19 in the body member 27, passes over the slide member 15 and returns through the slot 19, its end portions 21a, 21b being subject to tension in the harness. By virtue of the slidable mounting of the slide member 15, the tension acting on the strap 21 causes the slide member to become wedged in the cavity in the body member 27, so that the strap is clamped against the two wings 18, the clamping force acting over the full width of the strap.

When the strap is relieved from tension the slide member 15 can be removed from the body member 27 and the strap can be adjusted in length by causing it to move along the slide member.

The provision of the stud 20 to engage a hole 22 holds the strap 21 lightly against displacement from its selected adjusted position when the strap is not under tension, e.g. when removing the harness from the horse or in many other cases. However, there is no localised force in the vicinity of the hole 22 when the strap is under tension in the buckle.

What I claim is:

1. In the harness adapted to be worn by a horse for pulling a sulky, the harness comprising a central element for mounting on the horse's back and a plurality of straps connected to the central element by buckles, the straps comprising superposed layers of leather and plastics material, the improvement that the buckles each comprise a body member having an elongated slot therein through which a double thickness of the strap may pass, two wings extending along the length of the slot and located one on each side of the slot, the wings diverging from each other in a direction away from the slot so as to define walls of a wedge-shaped cavity, the body member further carrying rigidly with it a guide bracket having two parallel limbs connected at one end to each other by a crosspiece and connected at their other ends to the body member with the limbs straddling the length of the slot; and including a slide member mounted on the limbs of the guide bracket and slidable along it, the slide member comprising a first elongated portion that has two holes therein each accommodating a limb of the guide bracket, and a second part of wedge shape that is solid with the first part and is located between the limbs of the guide bracket, such second part being adapted to extend into the wedge-shaped cavity between the wings of the body member and to lock against the walls of the cavity a strap that is threaded through the slot to pass over the slide member and return through the slot.

2. The harness of claim 1 in which the first part of the slide member carries a pin projecting towards the crosspiece of the guide bracket, and the strap is perforated at intervals to receive the pin.

* * * * *